United States Patent [19]
Deal et al.

[11] Patent Number: 5,690,469
[45] Date of Patent: Nov. 25, 1997

[54] METHOD AND APPARATUS FOR REPLACING A VANE ASSEMBLY IN A TURBINE ENGINE

[75] Inventors: James L. Deal, Amston; Foster P. Lamm, South Windsor; Gustavo Moreno, West Hartford, all of Conn.

[73] Assignee: United Technologies Corporation, Hartford, Conn.

[21] Appl. No.: 660,050

[22] Filed: Jun. 6, 1996

[51] Int. Cl.⁶ .................................................. F01O 9/04
[52] U.S. Cl. .................. 415/189; 415/119; 415/209.2; 415/209.4; 29/889.1; 29/889.22
[58] Field of Search ........................... 415/189, 190, 415/209.2, 209.3, 209.4, 210.1, 119; 29/889.1, 889.22

[56] References Cited

U.S. PATENT DOCUMENTS

| | | | |
|---|---|---|---|
| 2,980,396 | 4/1961 | Movsesian | 415/189 |
| 3,365,173 | 1/1968 | Lynch et al. | 415/209.2 |
| 3,867,066 | 2/1975 | Canova et al. | 415/209.3 |
| 5,411,370 | 5/1995 | Varsik. | |

*Primary Examiner*—Edward K. Look
*Assistant Examiner*—Chrisopher Verdier
*Attorney, Agent, or Firm*—Kenneth C. Baran

[57] ABSTRACT

A repair kit for replacing an unserviceable vane assembly in a turbine engine includes a serviceable vane subassembly 120 having a serviceable airfoil 124 with a base 134 attached to the root end thereof and an opposing base 156 which is unattached to but slidably engagable with the serviceable airfoil. The opposing base is slipped over the tip end of the airfoil and slid toward the opposing base. The vane subassembly and opposing base are pivoted into position between inner and outer engine cases in place of an unserviceable vane assembly so that receptor sockets 148, 150 in the attached base engage support pins 72 extending from the inner case. An adhesive 182 is applied to the tip end of the serviceable airfoil and the opposing base is translated into its installed position near the tip end of the airfoil. Upon curing of the adhesive, the opposing base becomes attached to the airfoil. The base is secured to the outer case by studs 196 and nuts 198.

13 Claims, 8 Drawing Sheets

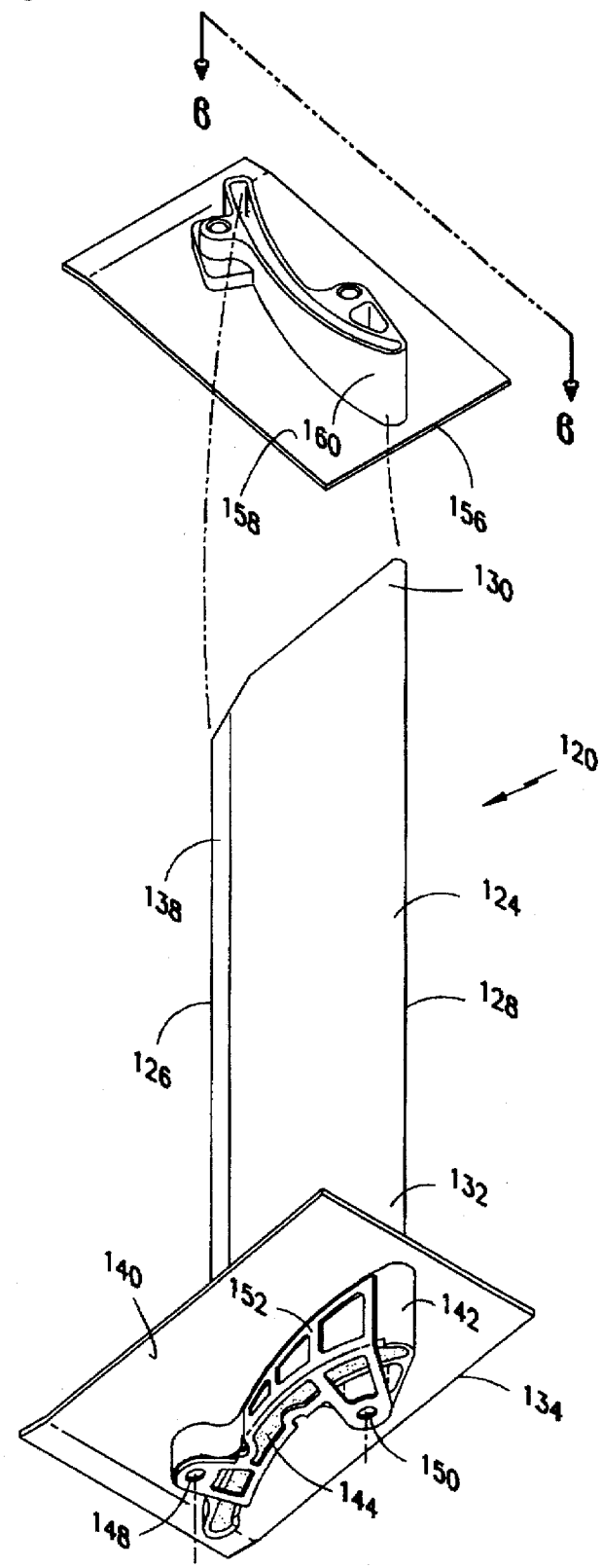

METHOD AND APPARATUS FOR REPLACING A VANE ASSEMBLY IN A TURBINE ENGINE

TECHNICAL FIELD

This invention relates to a method for quickly and conveniently replacing an unserviceable stator vane assembly in a gas turbine engine and to a repair kit useful for carrying out the method.

BACKGROUND OF THE INVENTION

Gas turbine engines employ axially alternating arrays of rotating blades and nonrotating stator vane assemblies in their fan, compressor and turbine sections to exchange energy with a working medium fluid and to direct the working medium fluid through the engine. The fan blades are attached to a rotating hub and extend radially across a fan flowpath and into close proximity with an outer case. The fan stator vane assemblies also extend radially across the fan flowpath and are secured to the outer case and to an inner case which is coaxial with the outer case.

The blades and the vane assemblies in the fan section of a turbine engine are susceptible to damage resulting from foreign objects which are occasionally ingested into the fan flowpath. In addition, particulates entrained in the working medium fluid can gradually erode the airfoil surfaces of the blades and the vane assemblies, reducing their efficiency and degrading the performance of the engine. In modern aircraft turbine engines, the fan exit guide vane assemblies are constructed of a nonmetallic material to minimize engine weight. The nonmetallic material has limited resistance to impact damage and erosion, and therefore it is not uncommon that the vane assemblies are rendered unserviceable by foreign objects and particulates.

Several options are available to an aircraft operator confronted with a damaged or eroded fan exit guide vane assembly. The simplest option is to remove the unserviceable vane assembly from the engine without installing a serviceable vane assembly in its place. This option is appealing since removal of an unserviceable vane assembly is straightforward, but installation of a serviceable replacement vane assembly into an otherwise fully assembled engine is far more difficult. Unfortunately, the absence of one or more vane assemblies causes a redistribution of operational aerodynamic forces thereby increasing the stress on the remaining vane assemblies. In addition, the absence of multiple adjacent vane assemblies creates a distorted flow field through the fan, which can compromise the fan's aerodynamic stability. There is, therefore, a limit to the number of vane assemblies and to the number of adjacent vane assemblies that can be accommodated in this manner. Eventually, one or more serviceable vane assemblies must be installed to take the place of each absent vane assembly.

A second, more drastic option is to substantially disassemble the fan section of the engine. The fan outer case, which circumscribes and is connected to the radially outer ends of the vane assemblies, is disconnected therefrom and removed. Replacement vane assemblies are then inserted radially into the vane array, and the outer case is reconnected to the vane assemblies. Clearly, this method entails considerable time and effort and therefore is unappealing unless extensive disassembly of the fan section is justified for other reasons.

In a third option, a sector of neighboring vane assemblies circumferentially adjacent to the unserviceable vane assembly (or the opening left by a previously removed vane assembly) is identified. The outer end of each vane assembly in the identified sector is disconnected from the circumscribing outer fan case. Once disconnected from the outer case, each vane assembly in the sector is tilted, in the circumferential direction, away from the unserviceable vane assembly without disengaging the vane assembly from a pinned connection at its inner end. Each vane assembly is tilted until a platform attached to the vane assembly's outer end circumferentially overlaps or "shingles" the outer platform of the neighboring vane assembly. By shingling a sufficiently large sector of vane assemblies, enough circumferential clearance is accumulated that the unserviceable vane assembly, if not previously removed, can also be tilted circumferentially, disengaged from its pinned connection, and removed axially from the vane array. A serviceable vane assembly is installed by reversing the procedure just described. While this shingling procedure is simpler and less time consuming than disassembling the fan section, it is nevertheless labor intensive, requiring approximately six hours of effort by a qualified mechanic.

Thus, it is seen that existing methods of accommodating or replacing a damaged fan exit guide vane assembly are of limited value, or are excessively time consuming and labor intensive.

SUMMARY OF THE INVENTION

It is, therefore, an object of the invention to provide a method and an associated apparatus for quickly and conveniently replacing a damaged fan exit guide vane assembly in a turbine engine.

According to the invention, a serviceable vane subassembly including an airfoil and an attached base is positioned, along with an opposing base which embraces but is unattached to the airfoil, between coaxial inner and outer cases so that the attached base is proximate to one of the cases; the opposing base is translated toward the other case and is attached to the airfoil and secured to the other case.

In one embodiment of the invention, the case to which the attached base is proximate includes at least one support pin and the attached base includes a receptor socket corresponding to each support pin. The subassembly is pivoted about an essentially lateral axis until each support pin engages its receptor socket.

In another, more detailed embodiment, the opposing base includes a sleeve which cooperates with the serviceable airfoil to define a peripheral gap therebetween. The step of attaching the opposing base to the serviceable airfoil includes applying a suitable adhesive to the airfoil surface near its tip end before the opposing base is translated toward its installed position. After the opposing base is translated into position, the adhesive cures thereby bonding the base to the airfoil.

The invention also comprehends a repair kit including a vane subassembly which includes a serviceable airfoil with a base attached to one end thereof, and an opposing base slidingly engageable with but unattached to the serviceable airfoil. In a more detailed embodiment of the repair kit, the serviceable airfoil is specially configured to facilitate pivoting the serviceable vane subassembly into position.

The primary advantage of the invention is the ease and convenience of replacing an unserviceable vane assembly with a serviceable vane assembly.

The foregoing features and advantage and the operation of the invention will become more apparent in light of the following description of the best mode for carrying out the invention and the accompanying drawings.

BRIEF DESCRIPTION OF THE DRAWINGS

FIG. 5 is a perspective view of a repair kit comprising a vane subassembly and a base according to the present invention.

BEST MODE FOR CARRYING OUT THE INVENTION

Figure 1:
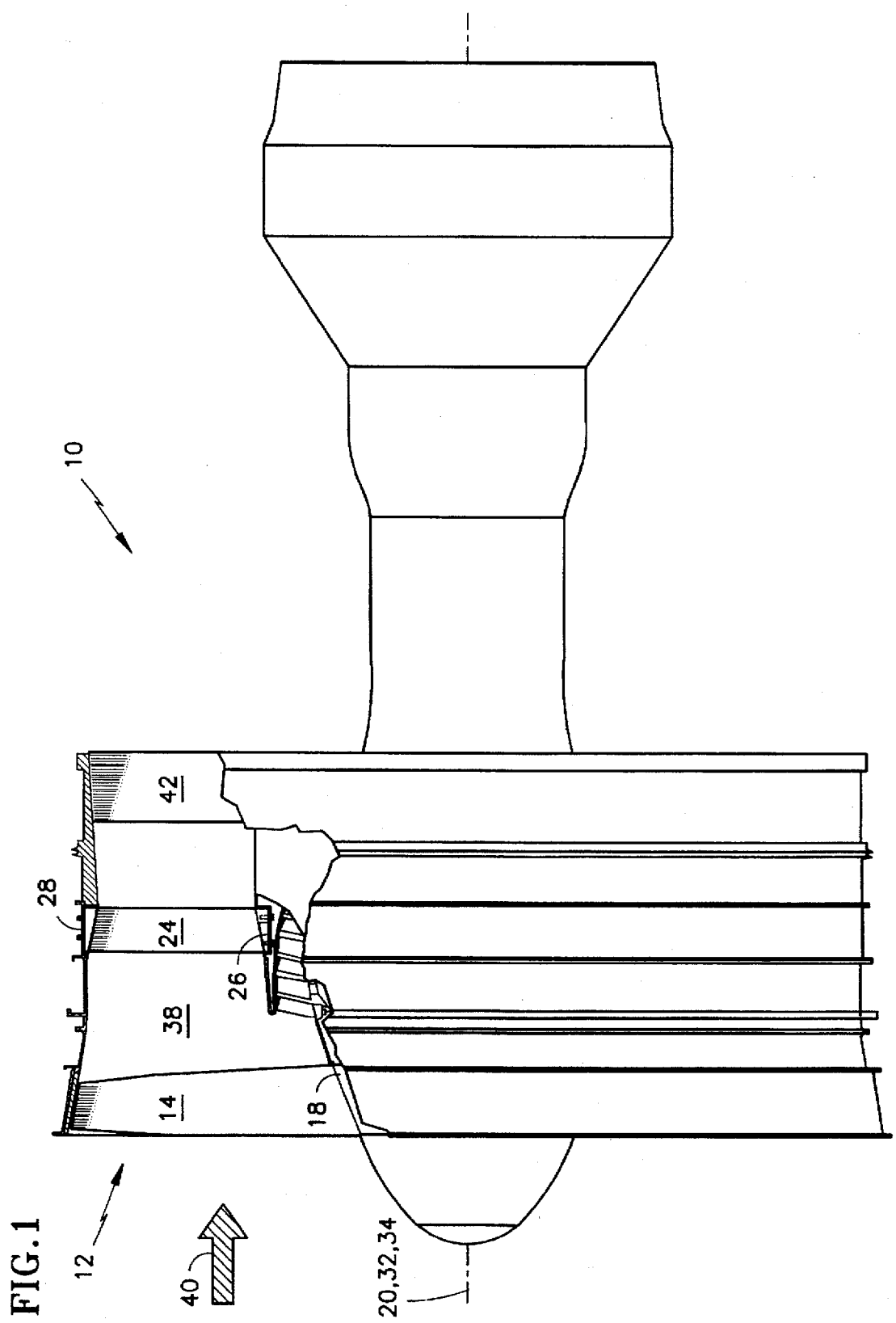
FIG. 1 is a schematic, partially sectioned side view of a turbine engine.

Referring to FIG. 1, a gas turbine engine 10 of the type used for aircraft propulsion includes a fan section 12 having an array of fan blades such as representative blade 14 extending radially outward from hub 18. The hub and blades are rotatable about an engine axis 20. The fan also includes an array of fan exit guide vane assemblies, such as representative guide vane assembly 24, which extends radially between inner and outer cases 26, 28 whose axes 32, 34 are common with the engine axis 20. A fan flowpath 38 extends through the fan section and a working medium fluid, such as air, flows through the flowpath in the direction generally indicated by directional arrow 40.

Figure 2:
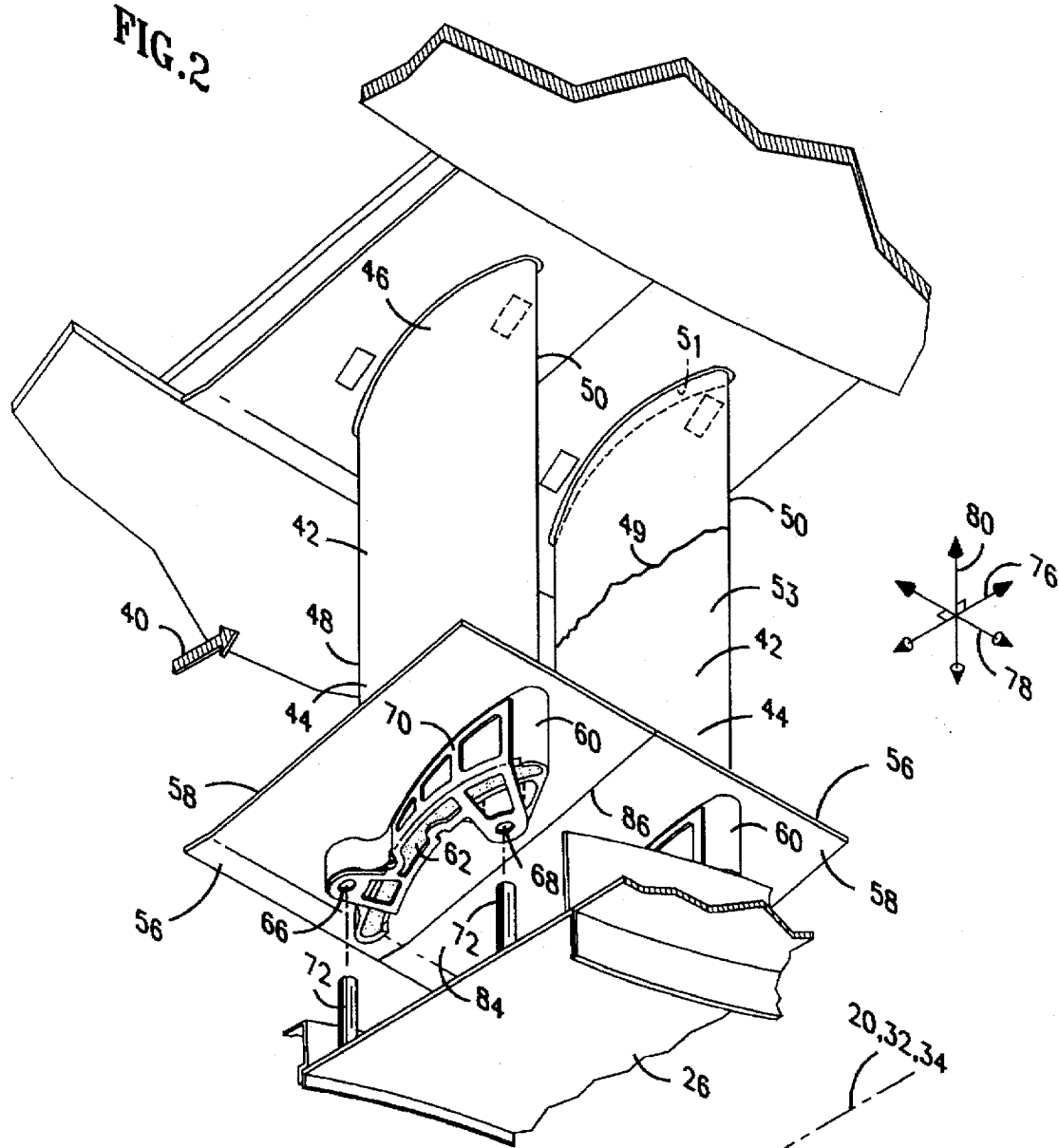
FIG. 2 is a partially exploded perspective view showing a portion of the fan section of a turbine engine including a fan exit guide vane assembly and the means by which the guide vane assembly is secured to an inner case.
Figure 3:
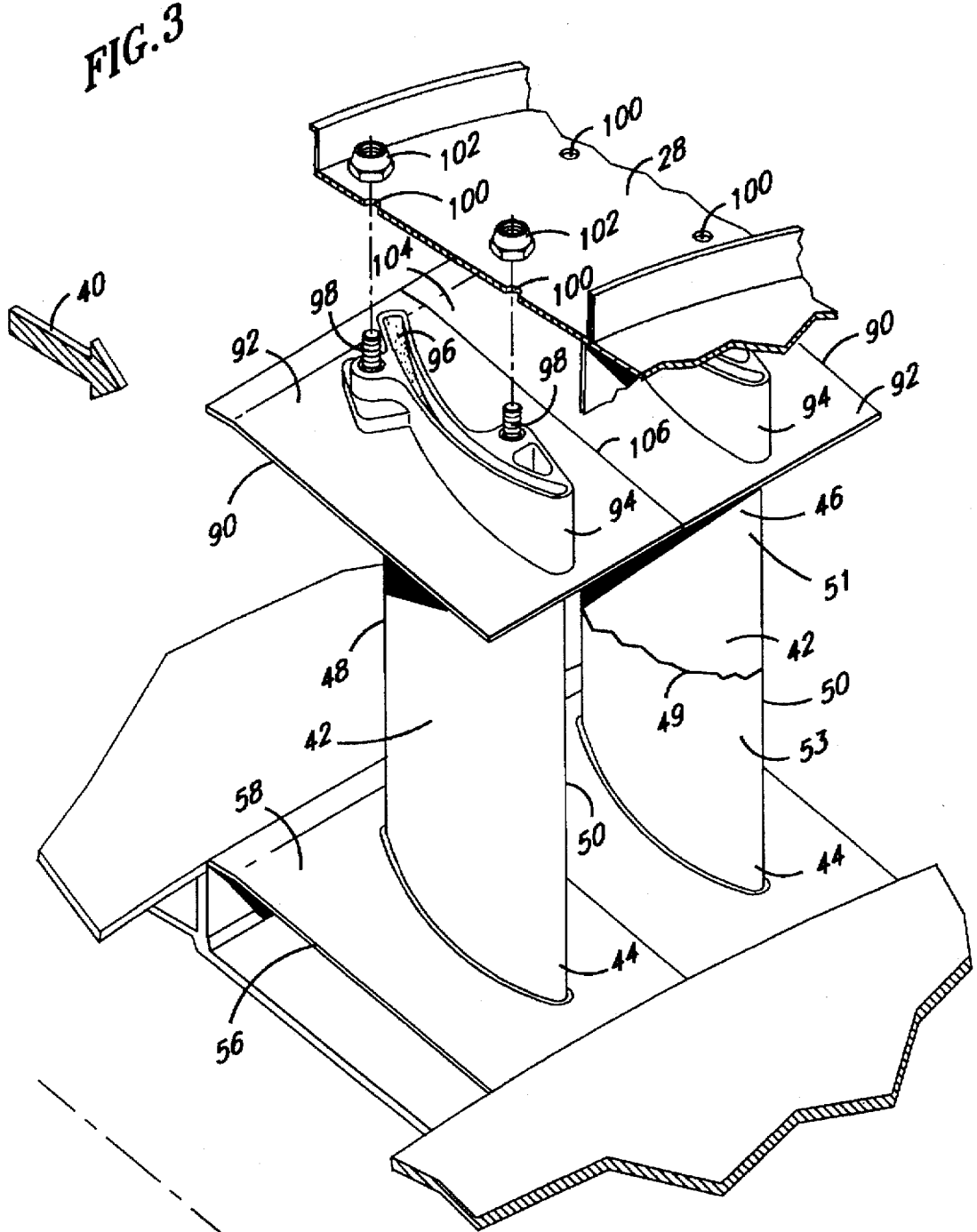
FIG. 3 is a partially exploded perspective view showing a portion of the fan section of a turbine engine including a fan exit guide vane assembly and the means by which the guide vane assembly is secured to an outer case.

Additional features of the vane assemblies are visible in FIGS. 2 and 3. Each vane assembly includes an airfoil 42 having an inner end 44 an outer end 46, a leading edge 48 and a trailing edge 50. Each vane assembly also includes a nonmetallic inner base 56 having a platform 58 and a sleeve 60 with a resilient polyurethane material 62 disposed therein. The inner end of the airfoil extends into the polyurethane material which damps airfoil vibrations and grips the inner end of the airfoil to attach the airfoil to the inner base. As discussed more fully in U.S. Pat. No. 5,411,370, the inner base also includes front and rear pin receptor sockets 66, 68 containing a polyurethane or silicone rubber material and a metallic shoe 70 which protects the base in the event of abnormal engine vibration. Each receptor socket corresponds to a support pin 72 extending radially outwardly from the inner case 26 (the view of FIG. 2 is slightly exploded so that the pins and receptor sockets are visible).

When fully assembled, each support pin engages its receptor socket to secure the inner base, and therefore the vane assembly, to the inner case, so that the base is radially spaced from the inner case to accommodate thermal expansion and contraction. The pinned connection secures the base to the inner case so that axial displacement (parallel to the engine axis as indicated by direction 76) and lateral displacement (tangent to the case as indicated by direction 78) are resisted while radial (direction 80) separation between the vane assembly and the case is unrestricted. Typically, a foam seal, not shown, is installed in the cavity 84 bounded by the inner case, the abutting platforms of neighboring inner bases and the sleeves associated with the neighboring inner bases. The foam seal minimizes leakage of air from the flowpath through seam 86 between abutting platforms.

The vane assembly also includes an outer base 90. The outer base has a platform 92 and a sleeve 94 with a polyurethane material 96 disposed therein. The outer end of the airfoil extends into the polyurethane material which damps airfoil vibrations and grips the outer end of the airfoil to attach the airfoil to the outer base. Studs 98 project radially outward from the outer base and extend through holes 100 in the outer case 28. (the view of FIG. 3 is slightly exploded so that the outer sleeve and studs are visible). Nuts 102 threaded onto the studs positively secure the outer base, and therefore the outer end of the vane assembly, to the outer case. A foam seal, not shown, is typically installed in the cavity 104 bounded by the outer case, the abutting platforms of neighboring outer bases and the sleeves associated with the neighboring outer bases. The foam seal minimizes leakage of air from the flowpath through seam 106 between abutting platforms.

The installation of the fan exit vane assemblies during factory construction of a new engine occurs with the inner case 26 resting on a support surface so that the case axis 32 is vertical. Each vane assembly 24 is slid radially onto a pair of support pins 72 so that the pins project into the receptor sockets 66 on the inner base 56. The outer case 28 is then positioned on the support surface so that the outer case circumscribes the vane assembly outer bases 90 and is coaxial with the inner case. Once the outer case is positioned, each vane assembly is slid radially outwardly along its pins until the outer sleeve 94 contacts the outer case 28. The studs 98 are inserted through both the outer platforms 92 and the case holes 100. Nuts 102 are threaded onto the studs to secure the outer base, and therefore the vane assembly, to the outer case. When necessary, disassembly is carried out by reversing the assembly procedure.

The above described procedure for assembling a guide vane array is accomplished during construction of a new engine at a factory. The corresponding disassembly procedure, followed by reassembly, may also be carried out during a major overhaul or heavy maintenance of an engine. However, such extensive disassembly and reassembly is expensive and time consuming and therefore is difficult to justify merely to replace a single (or a small number) of unserviceable fan exit vane assemblies. Moreover, the guide vane array and the inner and outer cases must be separated as a unit from the engine before the outer case can be disconnected from the guide vane assemblies and removed to provide access to the vane assemblies. It is clearly desirable to avoid the expenditure of effort and time associated with the above described procedures.

Figure 4:
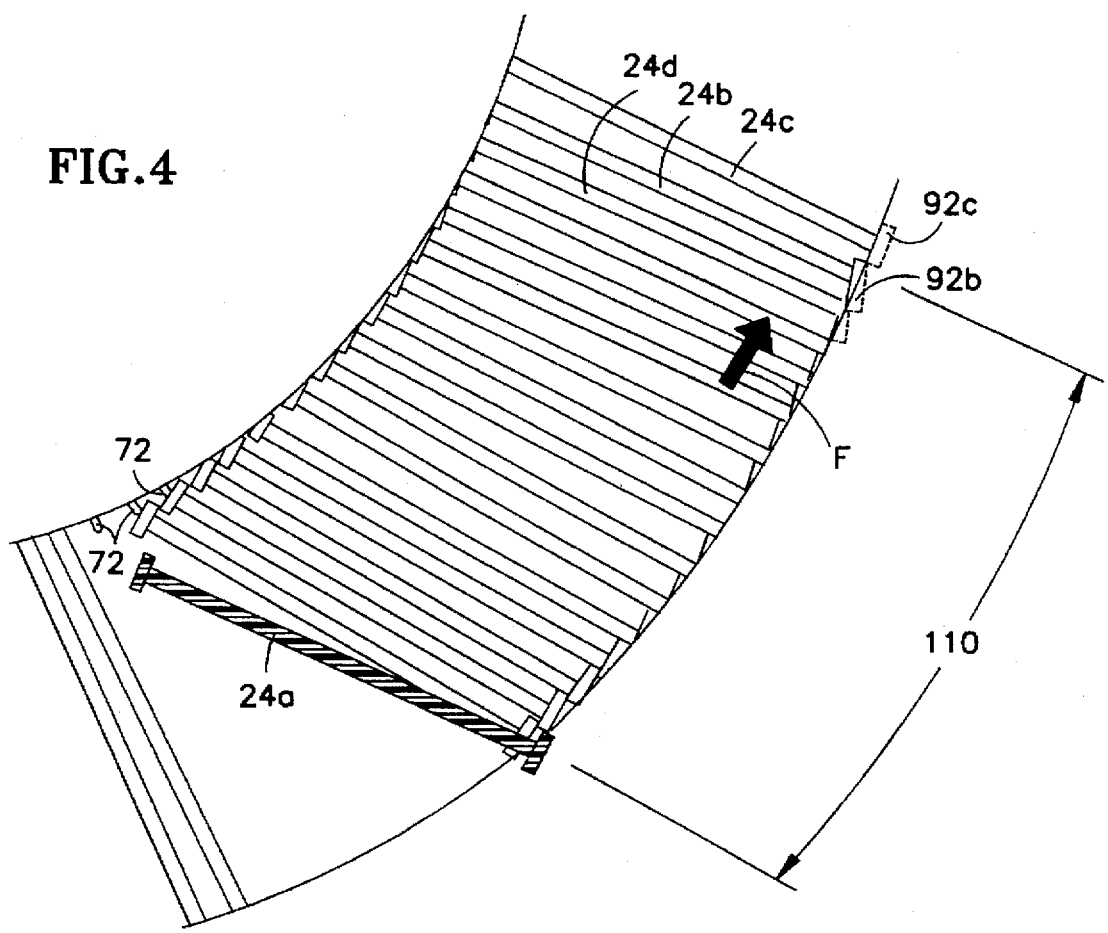
FIG. 4 is a schematic illustration of a portion of a fan exit guide vane array viewed parallel to the rotational axis of a turbine engine to demonstrate a prior art method of replacing an unserviceable vane assembly.

An alternate technique for removing and replacing a vane assembly is referred to as "shingling". Referring to FIG. 4, a sector 110 of neighboring vane assemblies, which are circumferentially adjacent to an unserviceable vane assembly 24a (or the opening left by a previously removed vane assembly), is identified. The outer end of the vane assembly 24b most remote from the unserviceable vane assembly is disconnected from the circumscribing fan case 28. The disconnected vane assembly is slid radially inwardly along its case support pins 72 so that its outer platform is radially displaced from the platforms of its neighbors 24c, 24d. A circumferentially directed force, such as force F, is applied to the outer end of the vane assembly. The resilient polyurethane material in the pin receptor sockets 66, 68 (FIG. 2) deforms elastically in response to the force so that the vane assembly tilts away from the unserviceable vane assembly without becoming disengaged from the support pins. The outer end of the vane assembly is urged circumferentially until its outer platform 92b overlaps or "shingles" the outer platform 92c of its neighbor. Each vane assembly in the sector is similarly disconnected and shingled with its neighbor. By shingling a large enough sector of vane assemblies, sufficient circumferential clearance is accumulated that the unserviceable vane assembly 24a, if not previously removed, can also be tilted circumferentially and disengaged from its support pins. The unserviceable vane assembly is then removed axially from the vane array and a serviceable vane assembly is installed by reversing the procedure just described. While this shingling procedure is simpler and less time consuming than disassembling the fan section, it is nevertheless labor intensive, requiring approximately six hours of effort by a qualified mechanic to replace a single vane assembly.

Figure 6:
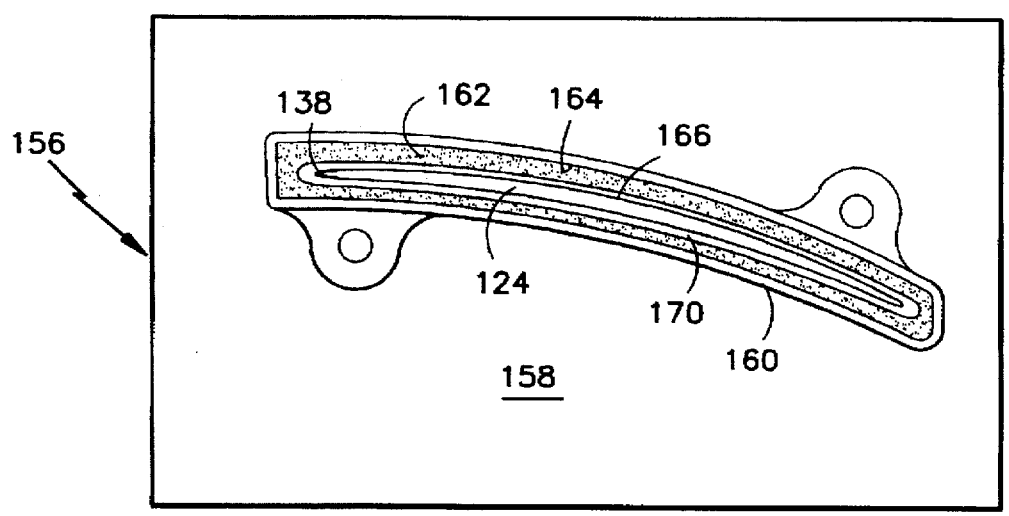
FIG. 6 is a plan view, taken essentially in the direction 6—6 of FIG. 5 showing further details of the opposing base.
Figure 7:
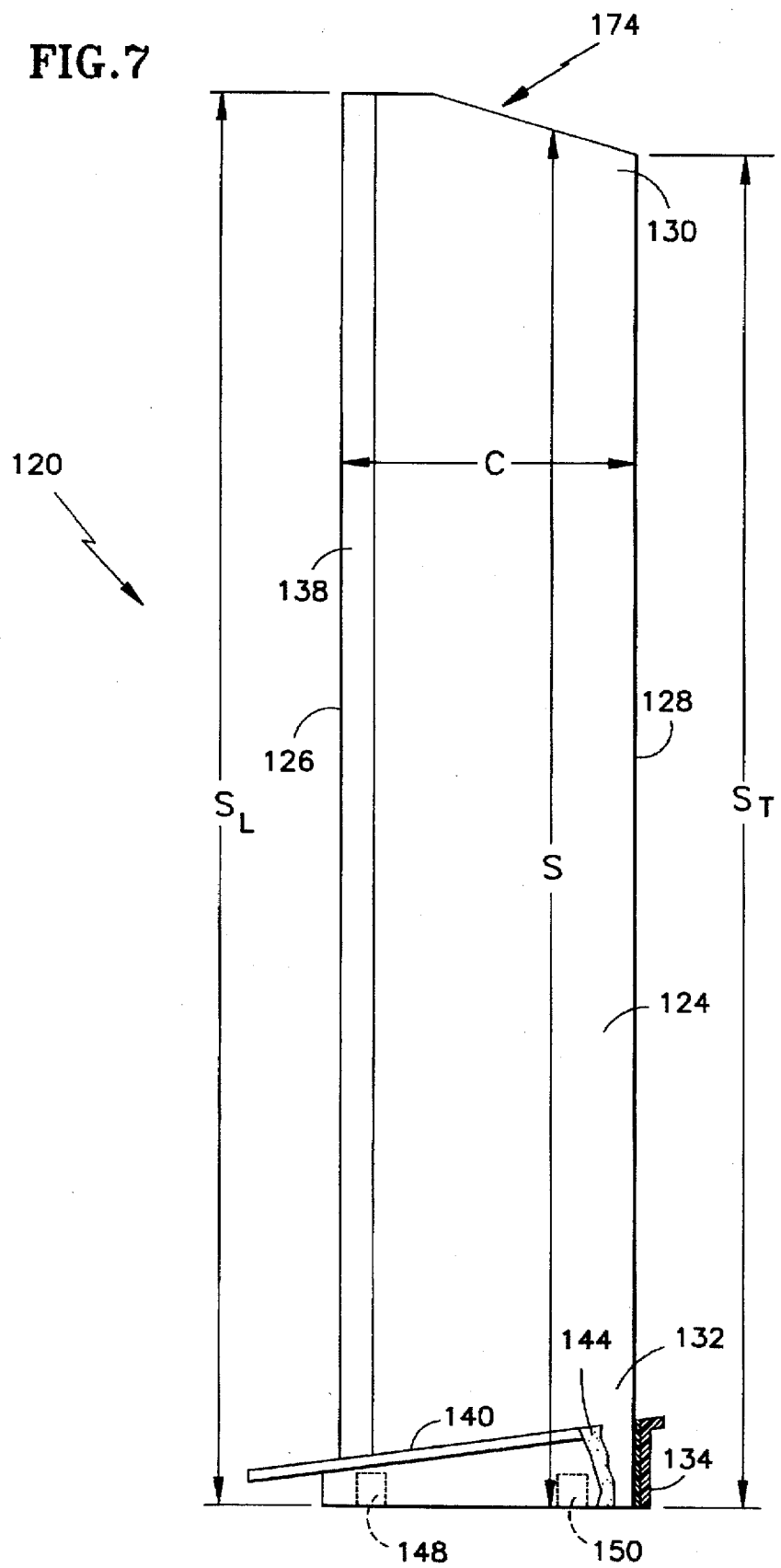
FIG. 7 is a side view of a serviceable vane subassembly of the present invention.

Referring now to FIGS. 5, 6 and 7, a repair kit for substantially simplifying the replacement of an unserviceable fan exit guide vane assembly is illustrated. The repair kit includes a serviceable vane subassembly 120 comprising a serviceable airfoil 124 having a leading edge 126 a trailing edge 128, a tip end 130, a root end 132 and a nonmetallic base 134 attached to the root end. The airfoil is a resin impregnated carbon fiber compression molded airfoil having an erosion resistant coating and a stainless steel erosion guard 138 extending along the leading edge. The airfoil may, however, be made of aluminum or any other suitable material. The chord C (FIG. 7) of the airfoil extends generally from the leading edge to the trailing edge and the span S of the airfoil extends generally from the root to the tip. The attached base 134 has a platform 140 and a sleeve 142 with a resilient polyurethane vibration damping material 144 disposed therein. The root end of the serviceable airfoil extends into the polyurethane material which grips the root end to attach the serviceable airfoil to the base and to damp vibrations of the airfoil. The attached base also includes front and rear pin receptor sockets 148, 150 containing a polyurethane or silicone rubber material and a metallic shoe 152 which protects the base in the event of abnormal engine vibration. The repair kit also includes an opposing base 156 comprising a platform 158 and a sleeve 160. A polyurethane vibration damping material 162 (FIG. 6) is bonded to interior wall 164 of the sleeve leaving an opening 166 which is slightly larger than but generally of the same shape as the serviceable airfoil 124. The opposing base 156 is unattached to the serviceable airfoil but, because opening 166 is larger than the airfoil, is slidingly engageable with the airfoil. That is, the opposing base can be slipped over the tip end of the airfoil and slid in the spanwise direction toward the attached base 134 so that the tip end of the airfoil projects through and is embraced by the sleeve. When so engaged, the damping material in the sleeve cooperates with the serviceable airfoil to define a peripheral gap 170 around the perimeter of the airfoil.

The tip of the serviceable airfoil, unlike that of the prior art airfoil, has a tapered region 174 from approximately 28% chord to 100% chord (i.e. to the trailing edge) so that the trailing edge span $S_T$ is approximately 97% as great as the leading edge span $S_L$. In addition, the span of the leading edge of the serviceable airfoil is approximately 98% of the leading edge span of an unserviceable airfoil. As explained more fully below, the taper and reduced span of the serviceable airfoil facilitate the installation of the serviceable vane subassembly into the vane array.

According to the present invention, use of the above described repair kit substantially simplifies the replacement of an unserviceable vane assembly. As best appreciated by reference to FIGS. 2 and 3 an unserviceable vane assembly is removed from a vane array in a turbine engine by severing the airfoil from its leading edge 48 to its trailing edge 50 (for example along line 49), removing the nuts 102 to disconnect the resulting outer stub 51 and outer base from the outer case, and sliding the inner stub 53 and inner base off the support pins.

Figure 8:
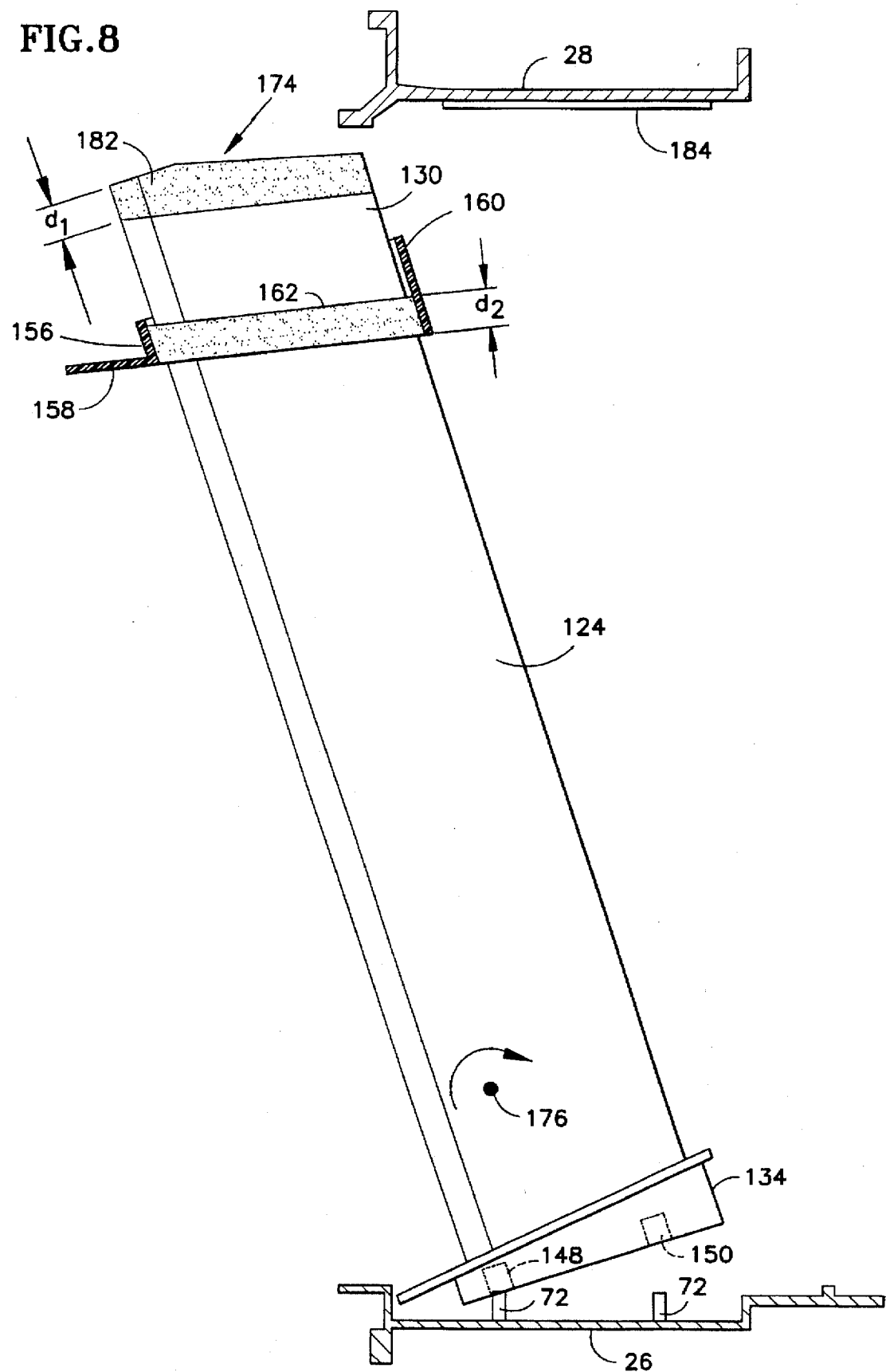
FIG. 8 is a side view of a serviceable vane subassembly and an opposing base of the present invention partially pivoted into position between an inner case and an outer case.
Figure 9:
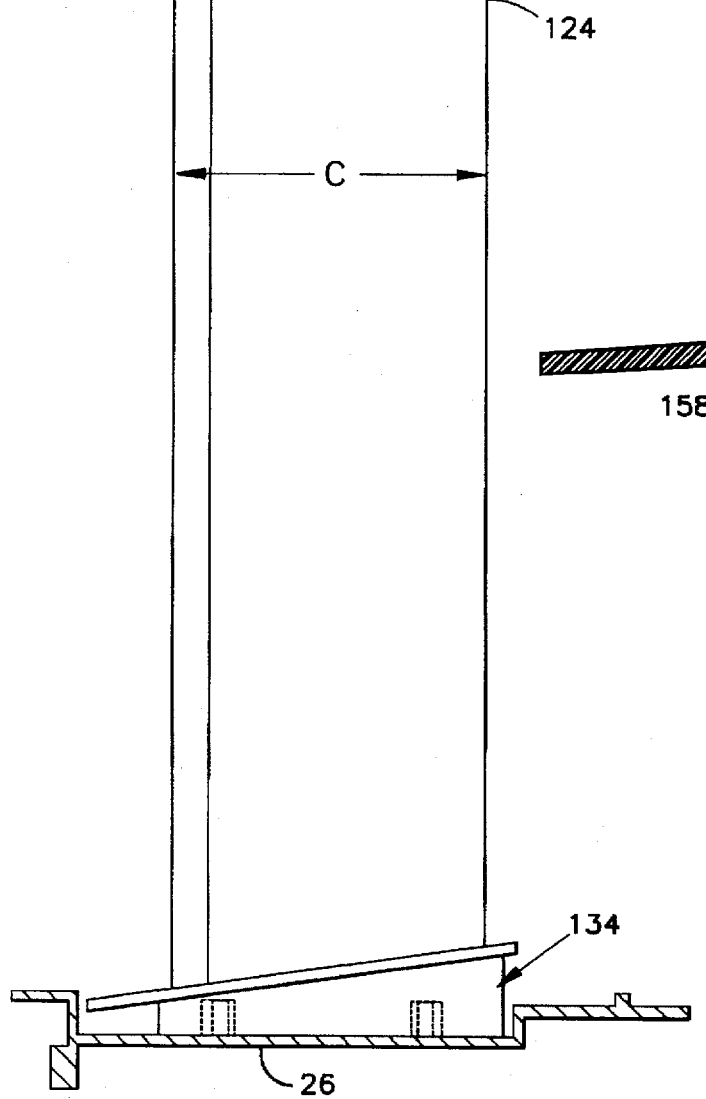
FIG. 9 is a side view of a serviceable vane subassembly and an opposing base of the present invention after having been installed between an inner case and an outer case.
Figure 10:
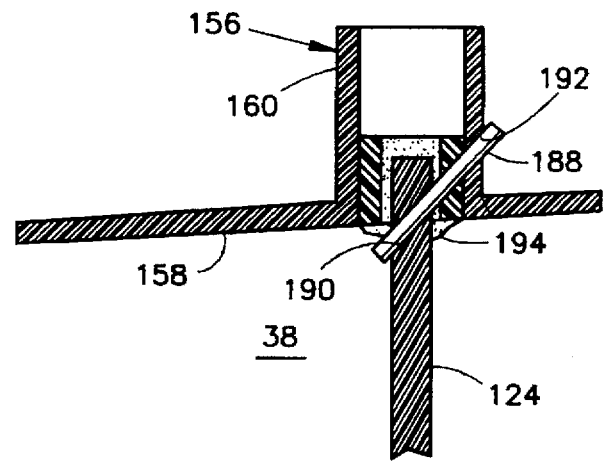
FIG. 10 is a view taken parallel to the engine axis showing a retaining pin projecting through a hole in the outer end of a serviceable airfoil and into an opposing base.

Referring now to FIGS. 8, 9, and 10, the method of replacing the unserviceable vane assembly includes sliding the opposing base 156 over the tip end 130 of the serviceable airfoil 124 and spanwisely toward the attached base so that the serviceable airfoil projects through and is embraced by the opposing base. The serviceable vane subassembly and opposing base are positioned, as best seen in FIG. 8, so that the attached base is in close proximity to the inner case 26 and the forward receptor socket 148 is partially engaged with its corresponding support pin 72. The subassembly is pivoted about an essentially lateral axis 176 and is urged radially inwardly along the support pins until each support pin completely engages its receptor socket. The tapered region 174 at the tip end 130 of the serviceable airfoil, along with the reduced length of the airfoil in comparison to a prior art airfoil, prevent interference between the tip end and the outer case 28 as the vane subassembly is pivoted into position. A urethane adhesive 182 is applied to the serviceable airfoil near its tip end so that the opposing base can subsequently be bonded to the tip end of the serviceable airfoil. In the preferred embodiment, the adhesive is applied around the entire perimeter of the airfoil and, as seen best in FIG. 8, extends from the extremity of the tip end toward the root a distance $d_1$ approximately equal to the depth $d_2$ of the damping material 162 to ensure completeness of the bond between the base and the airfoil.

Once the subassembly has been pivoted into position between the inner and outer cases, the opposing base is translated radially outward toward the tip end of the airfoil so that the adhesive 182, which cures in approximately four hours at 21 degrees C. (70 degrees F.), bonds the airfoil to the damping material 162 (FIG. 6) and therefore attaches the base to the airfoil. In the preferred embodiment a mask 184 is applied to the outer case prior to translating the opposing base radially outward. The mask may be a polyester film masking tape or any other mask which adheres nonpermanently to the case. Any adhesive 182 which is squeezed out of the peripheral gap 170 (FIG. 6) during the radially outward translation of the outer base contacts the tape rather than the outer case. Thus, the mask guards against the formation of an adhesive bond between the opposing base or airfoil and the outer case, thereby ensuring that the airfoil and the opposing base can, if necessary, be subsequently disassembled from the outer case. A retainer, which in the preferred embodiment is a metallic peg 188, is inserted into holes 190, 192 in the airfoil and opposing base so that the peg protrudes slightly into the fan flowpath 38 (FIG. 10).

The retainer positions the opposing base relative to the airfoil and limits the displacement of the opposing base relative to the vane subassembly in the event that the adhesive bond between the airfoil and the opposing base fails. An additional quantity 194 of adhesive is applied to the juncture of the airfoil and the damping material to augment the bond and to hold the retaining peg in place. As seen best in FIG. 9, the opposing base is positively secured to the outer case by studs and nuts 196, 198 so that platform 158 is flush with the neighboring platforms (as seen in FIG. 2 for a prior art fan blade array).

Although the invention has been described in the context of an aircraft gas turbine engine, it is equally applicable to land based and marine gas turbines as well as to steam turbines. Moreover, the invention may be useful in the installation of vane assemblies other than fan exit guide vane assemblies.

We claim:

1. A repair kit for replacing an unserviceable stator vane assembly in a gas turbine engine having an array of vane assemblies extending across an annular flowpath defined by coaxial inner and outer cases, the unserviceable vane assembly having an airfoil with inner and outer ends, an inner base attached to the inner end of the airfoil and secured to the inner case, an outer base attached to the outer end of the airfoil and secured to the outer case, the repair kit characterized by:

a serviceable vane subassembly comprising a serviceable airfoil having a leading edge, a trailing edge, a tip end, a root end and a base attached to the root end; and an opposing base which is slidingly engageable with the serviceable airfoil but unattached thereto so that the opposing base can be slipped over the tip end of the serviceable airfoil and slid toward the attached base until the serviceable airfoil projects through and is embraced by the opposing base.

2. The repair kit of claim 1 characterized in that the tip end of the serviceable airfoil is tapered from a part-chord position to one edge of the airfoil so that the serviceable vane assembly is pivotable into position in the vane array without interference between the tip end of the serviceable airfoil and the cases.

3. The repair kit of claim 2 characterized in that the span of the serviceable airfoil is less than the span of the airfoil associated with the unserviceable vane assembly.

4. A method of replacing an unserviceable stator vane assembly in a gas turbine engine having an array of vane assemblies extending across an annular flowpath defined by coaxial inner and outer cases, the method characterized by:

providing a serviceable vane subassembly comprising a serviceable airfoil having a leading edge, a trailing edge, a tip end, a root end and a base attached to the root end;

providing an opposing base;

sliding the opposing base over the tip end of the serviceable airfoil and spanwisely toward the attached base so that the serviceable airfoil projects through and is embraced by the opposing base;

positioning the serviceable vane subassembly and opposing base in place of the unserviceable vane assembly so that the attached base is proximate to one of the cases;

translating the opposing base to its installed position proximate to the other case and proximate to the tip end of the airfoil; and attaching the opposing base to the serviceable airfoil and securing the opposing base to the other case.

5. The method of claim 1 characterized in that the attached base includes at least one pin receptor socket, the one case to which the attached base is proximate includes support pins corresponding to each receptor socket and the step of positioning the serviceable vane subassembly comprises pivoting the serviceable vane subassembly about an essentially lateral axis so that each support pin engages its receptor socket.

6. The method of claim 2 characterized in that the tip end of the serviceable airfoil is tapered from a part-chord position to one of the airfoil edges to preclude interference between the tip end and the other case as the serviceable vane assembly is pivoted into position.

7. The method of claim 6 characterized in that the span of the serviceable airfoil is less than the span of an airfoil associated with the unserviceable vane assembly to facilitate the pivoting of the serviceable vane subassembly into position.

8. The method of claim 1 characterized in that the opposing base includes a sleeve which cooperates with the serviceable airfoil to define a peripheral gap around the perimeter of the serviceable airfoil and the step of attaching the opposing base comprises applying an adhesive to the serviceable airfoil near its tip end subsequent to the sliding step and prior to the translating step.

9. The method of claim 8 characterized in that the adhesive extends from substantially the extremity of the tip end of the airfoil toward the root end a distance sufficient to ensure completeness of the bond between the serviceable airfoil and the opposing base.

10. The method of claim 9 characterized in that the attaching step includes forcing a quantity of adhesive into the peripheral gap subsequent to the translating step.

11. The method of claim 10 characterized in that the attaching step includes installing a retainer to limit the relative displacement between the serviceable airfoil and the opposing base in the event of a failure of the adhesive.

12. The method of claim 11 characterized in that the retainer is a peg extending from the surface of the serviceable airfoil.

13. The method of claim 1 characterized in that the attached base includes at least one pin receptor socket, the one case to which the attached base is proximate is the inner case and includes support pins corresponding to each receptor socket, the attached base is secured to the inner case by the support pins so that lateral and axial displacement of the vane subassembly is resisted while radial separation between the vane subassembly and the inner case is unrestricted and the opposing base is positively secured to the outer case.

* * * * *

UNITED STATES PATENT AND TRADEMARK OFFICE
CERTIFICATE OF CORRECTION

PATENT NO. : 5,690,469
DATED : November 25, 1997
INVENTOR(S) : James L. Deal, Foster P. Lamm and Gustavo Moreno It is certified that error appears in the above-identified patent and that said Letters Patent is hereby corrected as shown below:

In claim 5, column 8, line 9 "claim 1" should read --claim 4--

In claim 6, column 8, line 17 "claim 2" should read --claim 5--

In claim 8, column 8, line 27 "claim 1" should read --claim 4--

In claim 13, column 8, line 49 "claim 1" should read --claim 4--

Signed and Sealed this

Seventeenth Day of February, 1998

Attest:

BRUCE LEHMAN

*Attesting Officer*    *Commissioner of Patents and Trademarks*